United States Patent Office 3,164,565
Patented Jan. 5, 1965

3,164,565
WATER-SWELLABLE POLYURETHANES FROM A POLYALKYLENE ETHER GLYCOL AND AN OXYALKYLATED DIPHENOL
James A. Calamari, Jr., Lake Jackson, Tex., assignor to The Dow Chemical Company, Midland, Mich., a corporation of Delaware
No Drawing. Filed Apr. 6, 1962, Ser. No. 185,535
9 Claims. (Cl. 260—47)

This invention relates to polyether polyurethane resins that are substantially insoluble in water but which swell in water to many times their initial volume. Moreover, they are substantially linear in structure; hence, they are soluble in organic solvents, thermoplastic, and readily molded or extruded. Typically, they are low-melting solids, generally having melting points in the range 50–100° C.

Bibulous polyurethane resins heretofore known were of the cross-linked type and, thus, were not soluble, moldable or extrudable. Typical examples of these are disclosed in U.S. Patent 2,948,691.

The resins of the present invention can be made by the reaction of an organic diisocyanate with a mixture of diols comprising (1) a long-chain, water-soluble polyoxyalkylene glycol and (2) a short-chain oxyalkylated diphenol.

Substantially any organic diisocyanate may be used in practicing the invention. Suitable ones include, but are not limited to, hexamethylenediisocyanate, benzene- and tolylenediisocyanates and bisphenyl-, oxybisphenyl-, methylenebisphenyl- and isopropylidenebisphenylisocyanates.

The long-chain, water-soluble polyglycol should have a molecular weight of at least about 3000 and preferably 4000 to 30,000 or more, and should consist predominantly of oxyethylene groups, though a minor proportion of other oxyalkylene groups may be included so long as the product is linear and water-soluble and has two hydroxyl groups per molecule. Such products are well known and can be made by condensing ethylene oxide with a difunctional starter such as water, glycol or a primary amine. Because of the high molecular weight of the product, the nature of the starter has little influence on the properties of the polyglycol.

The short-chain oxyalkylated diphenols useful in the present invention are those in which the oxyalkylene chains each contain 1 to about 10 oxyalkylene groups, depending somewhat on their nature. Thus, if they are oxyethylene groups, 10 or more such groups may be in each such chain. On the other hand, if they are oxybutylene groups the number per chain should not exceed about 3 or 4, else the hydrophilic nature of the final polyurethane would be impaired.

Substantially any diphenol can be used in making the short-chain oxyalkylated diphenols. The preferred ones are the biphenols, alkylenebisphenols, oxybisphenols, thiobisphenols, and the like, wherein each phenolic hydroxyl group is on a separate benzene nucleus. They may contain one or more inert substituents on each benzene ring, such as halogen or alkyl radicals. Suitable diphenols include diphenol, oxybisphenol, thiobisphenol, methylenebisphenol, isopropylidenebisphenol, 4,4'- oxybis (2-chlorophenol), 2,2'-methylenebis(4-bromophenol), 4,4'-isopropylidenebis,3,5-dibromophenol) and 4,4'-isopropylidenebis(3-butylphenol) and the like.

The proportions in which the long-chain and the short-chain oxyalkylated compounds are used depends on the hydrophobic-hydrophilic balance present in each and desired in the final product. The more hydrophilic the product, the greater the extent to which it swells in water or other aqueous medium. If too hydrophylic, however, the product will be largely water-soluble, and thus undesirable. Again, if the long-chain polyglycol has a very long chain and/or is made up substantially entirely of oxyethylene groups, it contributes strong hydrophilic properties to the final product and, thus, can counter-balance a substantially hydrophobic short-chain component such as one made from a bis(alkylphenol) and/or a hydrophobic alkylene oxide such as butylene oxide. Keeping the above considerations in mind, it is a simple matter to choose proportions such that the final product will have the desired bibulous properties and yet be insoluble in water. In general, the weight ratio of long-chain polyglycol to short-chain oxyalkylated diphenol will be about 5:1 to 100:1.

In making the resins of the invention, the diisocyanate is reacted with the two diols; i.e., the long-chain polyglycol and the short-chain oxyalkylated diphenol. Preferably, the two diols are mixed and the diisocyanate is then reacted with the mixture, though other techniques can be used. In the reaction, use can be made of the known catalysts for such reactions, suitable ones being alkali metal hydroxides, acetates and carbonates, tertiary amines, stannous salts, and the like. The reaction is conveniently conducted at temperatures which are conventional for such reactions, such as 25 to 140° C., and preferably, about 60–100° C. While the reaction can be conducted in the absence of diluent or solvent, it is usually preferred to use an inert solvent. Among the suitable solvents are benzene, toluene, methylene chloride, chloroform, perchloroethylene and the like.

The practice of the invention is illustrated by the following examples.

Example 1

A reactor was charged with a solution of 100 g. of polyethylene glycol (average molecular weight of 9000) in 400 g. of benzene. To this solution was added 5 g. of 2,2'-isopropylidenebis(p-phenyleneoxy)diethanol (the adduct of two moles of ethylene oxide to one mole of bisphenol A). The solution was then heated to reflux and 0.5 ml. of a 10 percent aqueous solution of sodium acetate was added. Water was removed by azeotropic distillation until the solution was dry, after which 3.9 ml. (1.00 molar equivalent, based on total diol) of tolylene diisocyanate were added. Reflux was continued until the solution reached a viscosity of 715 centistokes (25° C.), which required about 2 hours. Five ml. of methanol were then added to inactivate any remaining isocyanate groups and the solvent was distilled under reduced pressure to leave a semi-transparent resin having a melting point of about 60° C. It was insoluble in water but swelled enormously therein to hold about 14 times it weight of water.

Example 2

The procedure of Example 1 was repeated except that the amounts of isopropylidenebis(phenyleneoxy)-diethanol and tolylene diisocyanate were reduced to 2 g. and 2.5 ml., respectively. The product was similar to that of Example 1 and swelled in water to an even greater extent.

Example 3

The procedure of Example 1 was repeated except that the polyethylene glycol had an average molecular weight of 20,000 and only 3.0 ml. (1.00 molar equivalent) of tolylene diisocyanate was used. The product was similar to that of Example 1 and swelled in water to an even greater extent.

Example 4

The procedure of Example 1 was repeated except that only 3.0 ml. (0.75 molar equivalent, based on total diol)

was used and the catalyst was 0.2 g. of stannous octoate. The product was similar to that of Example 1 except that it swells less.

The products of the invention are typically solid, thermoplastic resins having softening points of 50–100° C. They can be molded or extruded by conventional techniques to make shaped articles. They are particularly useful in those applications wherein there is needed a solid resin that is insoluble in water but which absorbs large quantities of aqueous fluids to form solid, hydrated gels. A particular use of this type is in oil well treatment wherein the granulated resin in the form of a slurry is pumped into the well to reduce fluid loss or wherein the granulated resin is swollen in hydrochoric acid and a slurry of the acid-swollen resin is pumped down the well to produce a controlled acidizing effect.

Other uses include use as a spray drift control agent and as a moisture retention agent is sandy soil.

I claim:

1. A polyether polyurethane resin which is soluble in organic solvents but insoluble in water and which is the reaction product of an organic diisocyanate with a mixture of at least two diols, a first said diol being a water-soluble polyoxyalkylene glycol having an average molecular weight of about 3000 to 30,000 and a second diol being an oxyalkylated diphenol containing from 2 to about 20 oxyalkylene groups, each such group containing 2 to about 4 carbon atoms, the weight ratio of said first diol to said second diol being about 5:1 to 100:1, the molar ratio of said diisocyanate to the total diol being about 0.75:1 to 1:1.

2. A resin, as defined in claim 1, wherein the polyoxyalkylene glycol is polyoxyethylene glycol having an average of molecular weight of about 4000 to 30,000.

3. A resin as defined in claim 1, wherein the oxyalkylated diphenol is oxyalkylated 4,4'-isopropylidenebisphenol.

4. A resin as defined in claim 3, wherein the oxyalkylated diphenol is 2,2'-isopropylidenebis(p-phenyleneoxy)diethanol.

5. A resin as defined in claim 1, wherein the diisocyanate is tolylene diisocyanate.

6. A polyether polyurethane resin which is insoluble but swellable in water and soluble in organic solvents and which is made by the reaction of about 0.75 to 1 mole of tolylene diisocyanate with 1 mole of a mixture of two diols, the first diol being polyoxyethylene glycol of avearge molecular weight about 3000 to 30,000 and second diol being that formed by the condensation of about 2 to 20 molar equivalents of an alkylene oxide containing 2 to 4 carbon atoms with an alkylenebisphenol, the weight ratio of said first diol to said second diol being about 5:1 to 100:1.

7. A resin as defined in claim 6, wherein the second diol is 2,2'-isopropylidenebis(p-phenyleneoxy)diethanol.

8. A process for making a polyether polyurethane resin which is insoluble but swellable in water and is soluble in organic solvents, which process comprises reacting by contacting about 0.75 to 1 mole of an organic diisocyanate with 1 mole of a mixture of at least two diols, a first said diol being a water-soluble polyoxyalkylene diol having an average molecular weight of about 3000 to 30,000 and a second diol being an oxyalkylated diphenol containing 2 to about 20 oxyalkylene groups, each said group containing 2 to about 4 carbon atoms, the weight ratio of said first diol to said second diol being about 5:1 to 100:1, the molar ratio of diisocyanate to the total diol being about 0.75:1 to 1:1.

9. The process defined in claim 8, wherein the reaction is conducted in an inert solvent.

References Cited in the file of this patent
UNITED STATES PATENTS

| | | |
|---|---|---|
| 2,899,411 | Schollenberger | Aug. 11, 1959 |
| 3,078,257 | Rinke et al. | Feb. 19, 1961 |